United States Patent
Chung

(10) Patent No.: US 10,929,303 B2
(45) Date of Patent: Feb. 23, 2021

(54) DATA STORAGE DEVICE UTILIZING VIRTUAL BLOCKS TO IMPROVE PERFORMANCE AND DATA STORAGE METHOD THEREOF

(71) Applicant: Silicon Motion, Inc., Jhubei (TW)

(72) Inventor: Chien-Chung Chung, Taipei (TW)

(73) Assignee: SILICON MOTION, INC., Jhubei (TW)

( * ) Notice: Subject to any disclaimer, the term of this patent is extended or adjusted under 35 U.S.C. 154(b) by 28 days.

(21) Appl. No.: 16/028,005

(22) Filed: Jul. 5, 2018

(65) Prior Publication Data
US 2019/0087349 A1    Mar. 21, 2019

(30) Foreign Application Priority Data
Sep. 18, 2017    (TW) .................................. 106131913

(51) Int. Cl.
| G06F 12/00 | (2006.01) |
| G06F 12/1009 | (2016.01) |
| G06F 12/02 | (2006.01) |
| G06F 3/06 | (2006.01) |

(52) U.S. Cl.
CPC .......... G06F 12/1009 (2013.01); G06F 3/061 (2013.01); G06F 3/064 (2013.01); G06F 3/0631 (2013.01); G06F 3/0665 (2013.01); G06F 3/0679 (2013.01); G06F 3/0688 (2013.01); G06F 12/0246 (2013.01); G06F 2212/7201 (2013.01)

(58) Field of Classification Search
CPC .... G06F 12/1009; G06F 3/061; G06F 3/0688; G06F 3/0679; G06F 3/064; G06F 12/0246; G06F 2212/7201; G06F 3/0665; G06F 3/0631; G06F 3/0644; G06F 3/0608
USPC ........................................................ 711/206
See application file for complete search history.

(56) References Cited

U.S. PATENT DOCUMENTS

| 5,974,528 | A | * | 10/1999 | Tsai | G06F 8/654 |
| | | | | | 712/37 |
| 6,978,342 | B1 | | 12/2005 | Estakhri et al. | |
| 7,516,266 | B2 | * | 4/2009 | Fu | G06F 12/0246 |
| | | | | | 711/103 |
| 2002/0024843 | A1 | * | 2/2002 | Tsuruda | G11C 29/806 |
| | | | | | 365/185.09 |
| 2005/0246480 | A1 | * | 11/2005 | Fu | G06F 12/0246 |
| | | | | | 711/103 |
| 2008/0109590 | A1 | | 5/2008 | Jung et al. | |
| 2008/0235306 | A1 | | 9/2008 | Kim et al. | |
| 2008/0301256 | A1 | * | 12/2008 | McWilliams | G06F 12/0802 |
| | | | | | 709/214 |
| 2014/0181376 | A1 | * | 6/2014 | Miyamoto | G06F 12/0246 |
| | | | | | 711/103 |
| 2014/0297927 | A1 | * | 10/2014 | Katori | G06F 12/0638 |
| | | | | | 711/103 |

(Continued)

*Primary Examiner* — Mardochee Chery
(74) *Attorney, Agent, or Firm* — McClure, Qualey & Rodack, LLP

(57) ABSTRACT

The data storage method includes selecting one of a plurality of blocks in a flash memory as an active block; dividing the active block into a plurality of virtual blocks; selecting and accessing one of the virtual blocks; and maintaining a mapping table corresponding to the selected virtual block. The mapping table records mapping information between a plurality of logical addresses and a plurality of physical addresses of the selected virtual block.

18 Claims, 7 Drawing Sheets

(56) References Cited

U.S. PATENT DOCUMENTS

2016/0335208 A1* 11/2016 Slaight ................ G06F 12/0866
2017/0199703 A1* 7/2017 Ravimohan ......... G06F 12/0607

* cited by examiner

DATA STORAGE DEVICE UTILIZING VIRTUAL BLOCKS TO IMPROVE PERFORMANCE AND DATA STORAGE METHOD THEREOF

CROSS REFERENCE TO RELATED APPLICATIONS

This Application claims priority of Taiwan Patent Application No. 106131913 filed on Sep. 18, 2017, the entirety of which is incorporated by reference herein.

BACKGROUND OF THE INVENTION

Field of the Invention

The disclosure generally relates to a data storage device and a data storage method, and more particularly, to a data storage device and a data storage method which utilize the virtual block to improve performance.

Description of the Related Art

There are various forms of nonvolatile memory used in data storage devices for long-term data retention, such as flash memory, magneto-resistive RAM, ferroelectric RAM, resistive RAM, spin transfer torque-RAM (STT-RAM), and so on.

How to improve the operational efficiency of a data storage device is an important issue in this area of technology.

BRIEF SUMMARY OF THE INVENTION

The present invention provides a data storage method which divides the block of the flash memory into several virtual blocks, each of the virtual blocks respectively accesses data, and arranges the corresponding mapping table for each virtual block to record the number of valid pages in the virtual blocks. Therefore, when data reading or data writing is performed, the performance of the data storage device can be improved and the storage space of the data storage device can be reduced by the management of the virtual blocks without using up much storage space.

The present invention provides a data storage method. The data storage method includes selecting one of a plurality of blocks in a flash memory as an active block; dividing the active block into a plurality of virtual blocks; selecting and accessing one of the virtual blocks; and maintaining a mapping table corresponding to the selected virtual block. The mapping table records mapping information between a plurality of logical addresses and a plurality of physical addresses of the selected virtual block.

The present invention provides a data storage method. The data storage method includes selecting one of a plurality of blocks in a data storage device as an active block; dividing the active block into a plurality of virtual blocks; selecting one of the virtual blocks; issuing a command with a physical address of the selected virtual block to the data storage device; and updating a mapping table recording mapping information between a logical address and the physical address.

The present invention provides a data storage method. The data storage method includes selecting a source block; dividing the source block into a plurality of virtual blocks; selecting one of the virtual block of the source block; selecting a destination block; determining whether the number of valid page of the selected virtual block is zero; and if the determination is true, selecting another virtual block of the source block.

The present invention provides a data storage device including a flash memory and a controller. The flash memory includes a plurality of blocks. Each of the blocks comprises a plurality of pages. The controller is configured to select one of the blocks as an active block, divide the active block into a plurality of virtual blocks, select and access one of the virtual blocks and maintain a mapping table corresponding to the selected virtual block. The mapping table records mapping information between a plurality of logical addresses and a plurality of physical addresses of the selected virtual block.

Other aspects and features of the present invention will become apparent to those with ordinarily skill in the art upon review of the following descriptions of specific embodiments of the data storage device and the data storage method.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
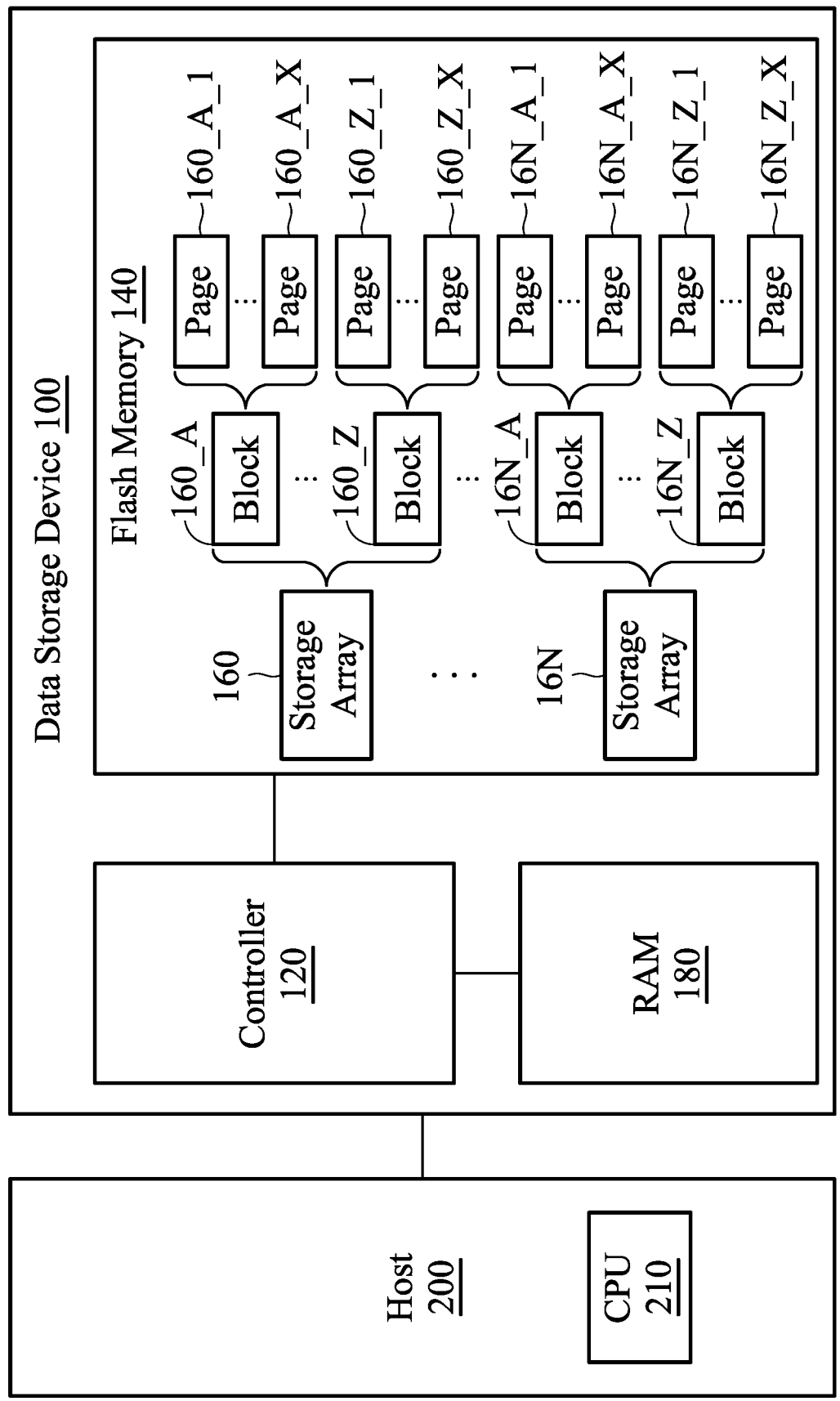
FIG. 1 is a block diagram illustrating the data storage device and the host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram illustrating the data storage device 100 and the host 200 according to an embodiment of the invention. In one embodiment, the data storage device 100 includes a controller 120, a non-volatile memory, and a random access memory (RAM) 180. The data storage device 100 is coupled to the host for transmitting data and commands, or receiving data and commands. The communication protocol between the data storage device 100 and the host 200 complies with the eMMC standard, the UFS standard, the SD standard, the SATA standard, or the NVMe standard. The non-volatile memory can be NAND flash, magneto-resistive RAM, ferroelectric RAM, resistive RAM (RRAM), spin transfer torque RAM (STT-RAM), and so on, in order to store data for a long time. The flash memory 140 will be used as an example for illustration in the following description, but it is not limited thereto.

As shown in FIG. 1, the controller 120 is coupled to the flash memory 140 and the RAM 180. The RAM 180 is utilized to temporarily store and cache the data which is needed by the controller 120, or temporarily store the data which will be written to the flash memory 140 by the host 200 in order to facilitate timely access to the data storage device 100. The RAM 180 is preferably SRAM, or it can be DRAM. The controller 120 is coupled to the flash memory 140 to transmit data and instructions or to receive data and instructions mutually. In one embodiment, there are four channels (CH0~CH3) between the controller 120 and the flash memory 140 to transmit data or commands. Furthermore, the controller 120 can be a read-only-memory (ROM) and a micro-controller with firmware code, and the micro-controller executes the firmware code to operate or access the flash memory 140.

The flash memory 140 includes a plurality of storage arrays 160~16N. For example, the flash memory 140 has four storage arrays 160~16N (which are CE0~CE3). Each plane includes several blocks 160_A~16N_Z, and each block includes several pages. In one embodiment, each block of each plane is combined into a super block so that the flash memory 140 includes several super blocks and each super block includes several super pages. As shown in FIG. 1, the storage unit 160 includes several blocks 160_A~160_Z. The storage unit 16N includes several blocks 16N_A~16N_Z. Regarding the storage unit 160, each of the blocks 160_A~160_Z further includes several pages 160_A_1~16N_Z_X. For example, X is 768, the data storage capacity of each page 160_A_1~16N_Z_X is 16 KB, and the page capacity of a page is four time the data of 4 KB. When the writing operation is performed on the flash memory 140 by the controller 120, the data is written with the minimum data writing unit of a page. The page is controlled by the word line.

Regarding the flash memory 140, each physical page 160_A_1~16N_Z_X (which is called page) of the blocks 160_A~16N_Z has a different physical address. In other words, each of the pages 160_A_1~16N_Z_X has a physical page, and the physical pages of the pages 160_A_1~16N_Z_X are different. When a data writing operation is performed by the data storage device 100, the controller 120 determines which physical address (i.e., page) of the flash memory 140 to write data into. In addition, the controller 120 maps the above physical addresses to the respective logical addresses of the data, and develops a mapping table L2P (Logical addresses to Physical addresses). In addition, if the page has extra space, the logical address of the data can be written to the page by the controller 120. Afterwards, the host 200 reads the data stored in a logical address of the data storage device 100 through the logical address. Furthermore, the controller 120 stores the mapping table P2L (Physical addresses to Logical addresses) at the end of the block or the super block to record the mapping relationship between the physical address and the logical address of the data of the block or the super block. When the mapping table L2P is lost or damaged, the controller 120 can read the mapping table P2L stored by the block or the super block to re-develop the mapping table L2P.

Figure 2B:
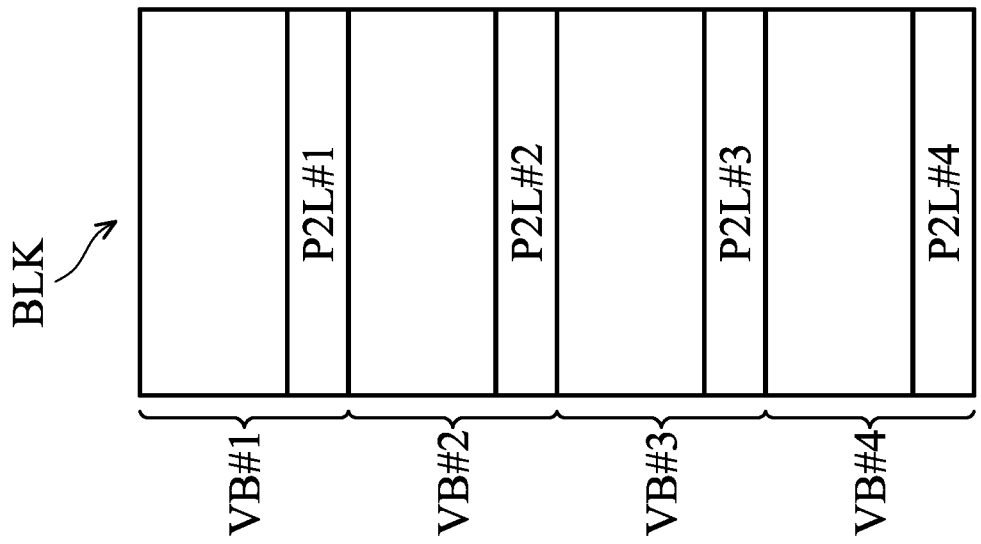
FIG. 2B is a schematic diagram illustrating the block and its virtual block according to an embodiment of the invention.
Figure 2A:
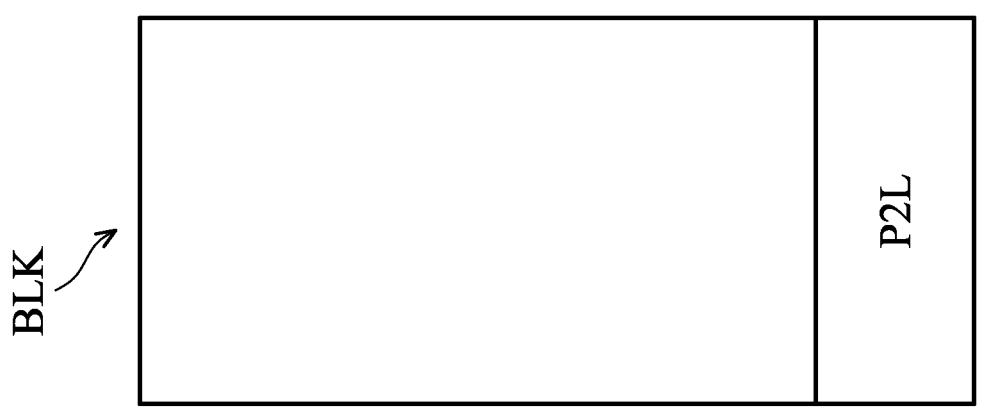
FIG. 2A is a schematic diagram illustrating the block according to an embodiment of the invention.

FIG. 2A is a schematic diagram illustrating the block BLK according to an embodiment of the invention. The above block BLK can be any one of blocks 160_A~16N_Z of FIG. 1 or the super block composed of a portion of storage arrays 160~16N, which are not limited by the present invention. As shown in FIG. 2A, the block BLK stores the mapping table to record the mapping relationship between the physical address and the logical address. However, as the storage space of the BLK increases, the data size of the corresponding mapping table P2L also increases. Since the storage space of the RAM embedded in the flash memory 140 is limited, a large mapping table P2L might not be stored in the RAM embedded in the flash memory 140, and the risk of losing or damaging the mapping table P2L due to a power-off event also increases. The maintenance of the mapping table P2L becomes more difficult when the RAM 180 is not arranged for the data storage device 100.

FIG. 2B is a schematic diagram illustrating the block BLK and its virtual block according to an embodiment of the invention. In one embodiment, the controller 120 divides the block BLK into several virtual blocks VB#1~VB#4. For example, the block BLK has 3072 pages or 1024 word lines. Each of the virtual blocks VB#1~VB#4 has 768 pages or 256 word lines. In addition, the virtual blocks VB#1~VB#4 have corresponding mapping tables P2L#1~P2L#4 which are respectively recorded in any page or word line of the virtual blocks VB#1~VB#4. As shown in FIG. 2B, the virtual block VB#1 has mapping table P2L#1, the virtual block VB#2 has mapping table P2L#2, and so on. The summation of the four mapping tables P2L#1~P2L#4 is the original mapping table P2L of FIG. 2A. In other words, the data size of each mapping table P2L#1~P2L#4 is smaller than the data size of the original mapping table P2L. Therefore, the mapping tables P2L#1~P2L#4 can easily be stored by the data storage device 100 without taking up much storage space.

It should be noted that the above four virtual blocks VB#1~VB#4 and the above four mapping tables P2L#1~P2L#4 are used for illustration rather than limitation. People skilled in the art can divide the block BLK into another number of virtual blocks and mapping tables based on their needs. In one embodiment, the number N of virtual blocks VB#1~VB#N which are divided from the block BLK by the controller 120 is determined by the data size of the mapping table P2L and the storage space of the flash memory 140 or the RAM 180 used for storing the mapping table P2L. For example, the data size of the original mapping table P2L is 2 MB, and the storage space of one page or one word line is 100 KB. Accordingly, the controller 120 divides the block BLK into 20 virtual blocks VB#1~VB#20 and stores 20 mapping tables P2L#1~P2L#20 (which means N is 20) to meet the requirements on data size and storage space.

Specifically, each of the mapping tables P2L#1~P2L#4 is utilized to record the mapping information linking the physical addresses (the array number, the block number, and the page number or unit number) with the logical addresses. Furthermore, the mapping tables P2L#1~P2L#4 can be utilized to record the validity of data and record the number of available pages in the corresponding virtual blocks. The available pages mentioned above are pages which have not been damaged and which are available for reading and writing data properly. In another embodiment, available pages means there is remaining space for storing data.

Each of the virtual blocks VB#1~VB#4 respectively has its own corresponding mapping table P2L#1~P2L#4 to record its own mapping relationship linking the physical address with the logical address. The virtual blocks VB#1~VB#4 are independent of each other.

In another embodiment, when the controller 120 receives an erase command from the host 200, the controller 120 erases the entire block BLK that needs erasing to clear all data stored by the block BLK. In other words, when an erase procedure is performed on the block BLK, the entire block BLK is considered without investigating its virtual blocks VB#1~VB#4.

Therefore, the data storage method of the present invention performs data management based on the virtual blocks, which can be applied to various kinds of flash memories 140. When the storage space increases or decreases, or the architecture of the flash memory 140 changes, the data management method does not need to be greatly amended. The risk of losing or damaging the mapping table P2L due to a power-off event can be reduced.

Figure 3:
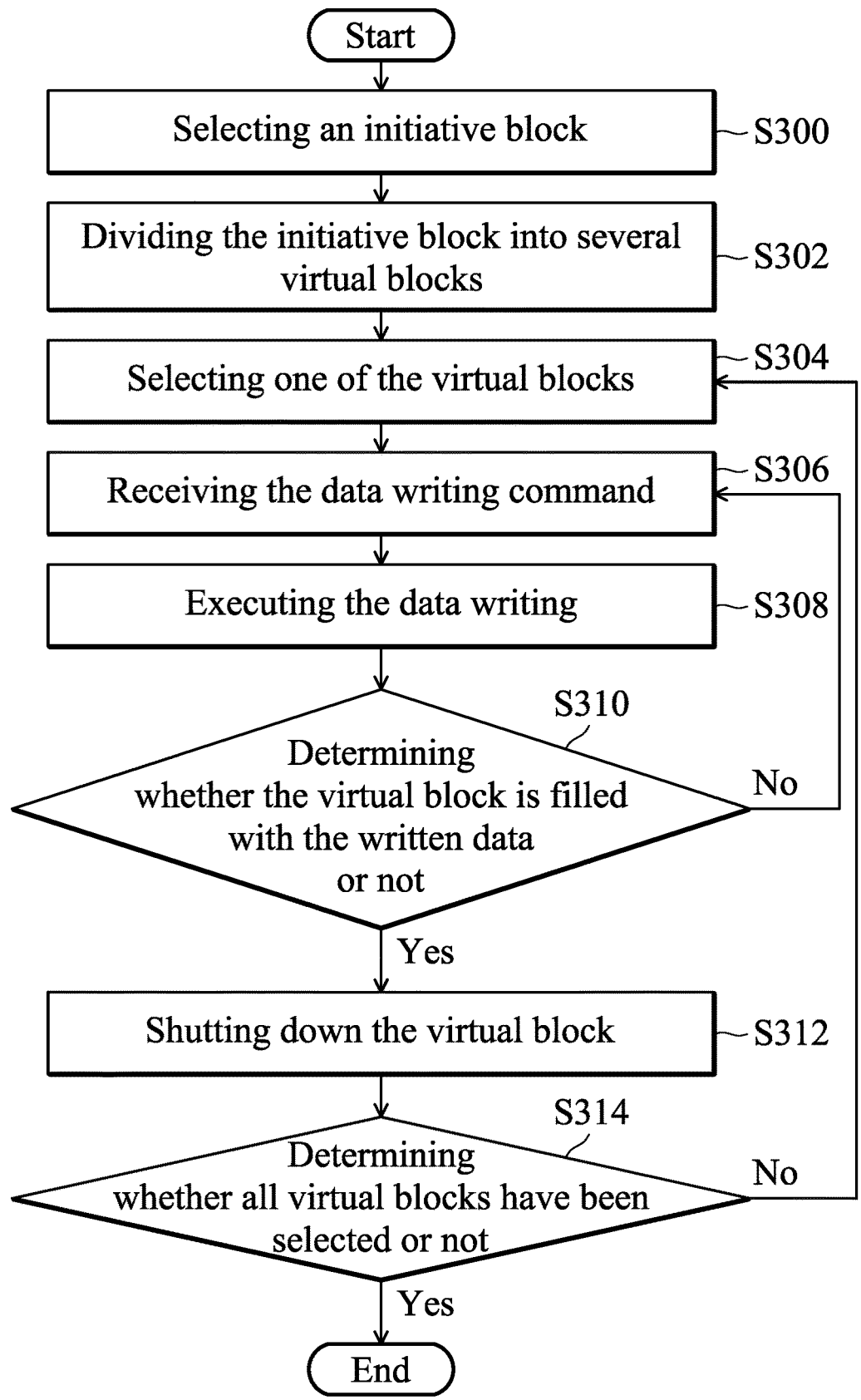
FIG. 3 is a schematic diagram illustrating a data storage method according to an embodiment of the invention.

FIG. 3 is a schematic diagram illustrating a data storage method according to an embodiment of the invention. In step S300, the controller 120 selects at least one of the blocks of the flash memory 140 to be the active block. The active block is utilized for storing the data from the host 200, or becoming the destination block during the garbage collection process. The following illustrating is based on storing data from the host 200.

In step S302, the controller 120 divides the active block into several virtual blocks VB#1~VB#N. In step S304, the controller 120 selects one of the virtual blocks, such as the virtual block VB#1. In step S306, the controller 120 receives the data writing command. The data writing command is from the exterior of the data storage device 100, such as the host 200.

In step S308, the controller 120 operates the selected virtual block, such as the virtual block VB#1, based on the data writing command for executing the data writing. In step S310, the controller 120 determines whether the virtual block is filled with the written data or not. Supposing that the virtual block VB#1 has 768 pages or 256 word lines, when the data has been written for 767 pages or 255 word lines, the virtual block VB#1 will be filled with the written data. The user data will not be written into the $768^{th}$ page or the $256^{th}$ word line corresponding to the writing command, and it will be written into the mapping table P2L#1.

In step S312, the controller 120 shuts down the virtual block, which means the controller writes the End of Block (EOB) into the $768^{th}$ page or the $256^{th}$ word line. The EOB records the information related to the virtual block VB#1, such as the mapping table P2L#1, the total number of valid pages, or the total amount of valid data. In addition, the obtaining of the total number of valid pages or the total amount of valid data is preferably prior to the writing of EOB. The mapping tables P2L#1 and L2P will be matched by the controller 120. If the logical address and the physical address of the identical data are the same in mapping tables P2L#1 and L2P, it will be valid data, and the total number of valid pages or the total amount of valid data will be incremented by one. If the logical address and the physical address of identical data are not the same in mapping tables P2L#1 and L2P, it will be invalid data.

In step S314, the controller 120 determines whether all virtual blocks have been selected or not. It can be known from the above description that only virtual block VB#1 has been selected and virtual blocks VB#2~4 have not been selected. Therefore, step S304 will be executed to select virtual block VB#2. After step S314 has been executed four times, the data storage method finishes since all of the virtual blocks have been selected.

Figure 4:
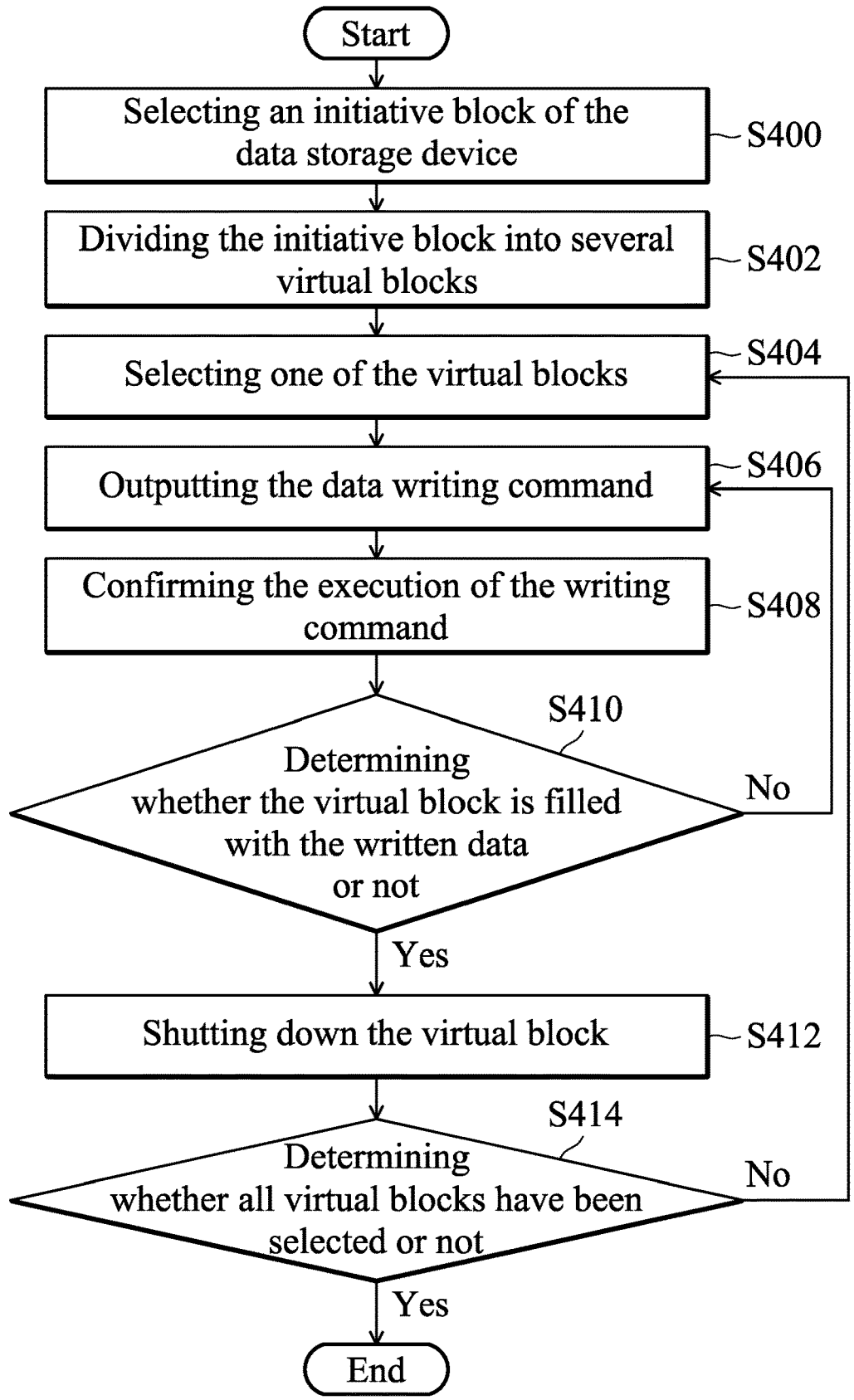
FIG. 4 is a schematic diagram illustrating a data storage method according to another embodiment of the invention.

FIG. 4 is a schematic diagram illustrating a data storage method according to another embodiment of the invention. The difference between this embodiment and the previous embodiment is that the data storage method is executed by the CPU 210 of the host 200 rather than the controller 120 of the data storage device 100 of the embodiment. The validity list bitMap is developed by the CPU 210, not by the controller 120. After the data storage device 100 is initialized, the operation parameters will be transmitted automatically to the CPU 210 by the controller 120 or based on the request of the CPU 210. The CPU 210 establishes the mapping table L2P based on the operation parameters and outputs the command to the controller 120 in order to indirectly control the operations of the flash memory 140. In step S400, the CPU 210 selects at least one of the blocks of the flash memory 140 to be the active block. The active block is utilized for storing the data from the host 200, or becoming the destination block during the garbage collection process. The following illustrating is based on storing data from the host 200.

In step S402, the CPU 210 divides the active block into several virtual blocks VB#1~VB#N. In step S404, the CPU 210 selects one of the virtual blocks, such as the virtual block VB#1. In step S406, the CPU 210 outputs the data writing command to the controller 120. The data writing command includes the data for writing and the physical address for writing, and preferably includes the logical address for writing.

In step S408, the execution of the writing command is confirmed. After the CPU 210 outputs the writing command to the controller 120, the controller 120 operates the flash memory 140 based on the data writing command. For example, the data for writing is written to the physical address for writing. If the data for writing is successfully written to the physical address for writing, the controller 120 feedbacks the command executing complete information to the CPU 210. When the CPU 210 receives the command executing complete information, it can be confirmed that the data writing command has been completed.

In step S410, the CPU 210 determines whether the virtual block is filled with written data or not. Supposing that the virtual block VB#1 has 768 pages or 256 word lines, when the data has been written for 767 pages or 255 word lines, the virtual block VB#1 will be filled with the written data. The user data will not be written into the $768^{th}$ page or the $256^{th}$ word line corresponding to the writing command, and it will be written into the mapping table P2L#1.

In step S412, the CPU 210 shuts down the virtual block, which means writing the End of Block (EOB) into the $768^{th}$ page or the $256^{th}$ word line. The EOB records the information related to the virtual block VB#1, such as the mapping table P2L#1, the total number of valid pages or the total amount of valid data. In addition, the obtaining of the total number of valid pages or the total amount of valid data is preferably prior to the writing of EOB. The mapping tables P2L#1 and L2P will be matched by the controller 120. If the logical address and the physical address of identical data are the same in mapping tables P2L#1 and L2P, it will be valid data, and the total number of valid pages or the total amount of valid data will be incremented by one. If the logical address and the physical address of identical data are not the same in mapping tables P2L#1 and L2P, it will be invalid data.

In step S414, the CPU 210 determines whether all virtual blocks have been selected or not. It can be known from the above description that only virtual block VB#1 has been selected and virtual blocks VB#2~4 have not been selected. Therefore, step S404 will be executed to select the virtual block VB#2. After step S414 has been executed four times, the data storage method finishes since all of the virtual blocks have been selected.

Figure 5A:
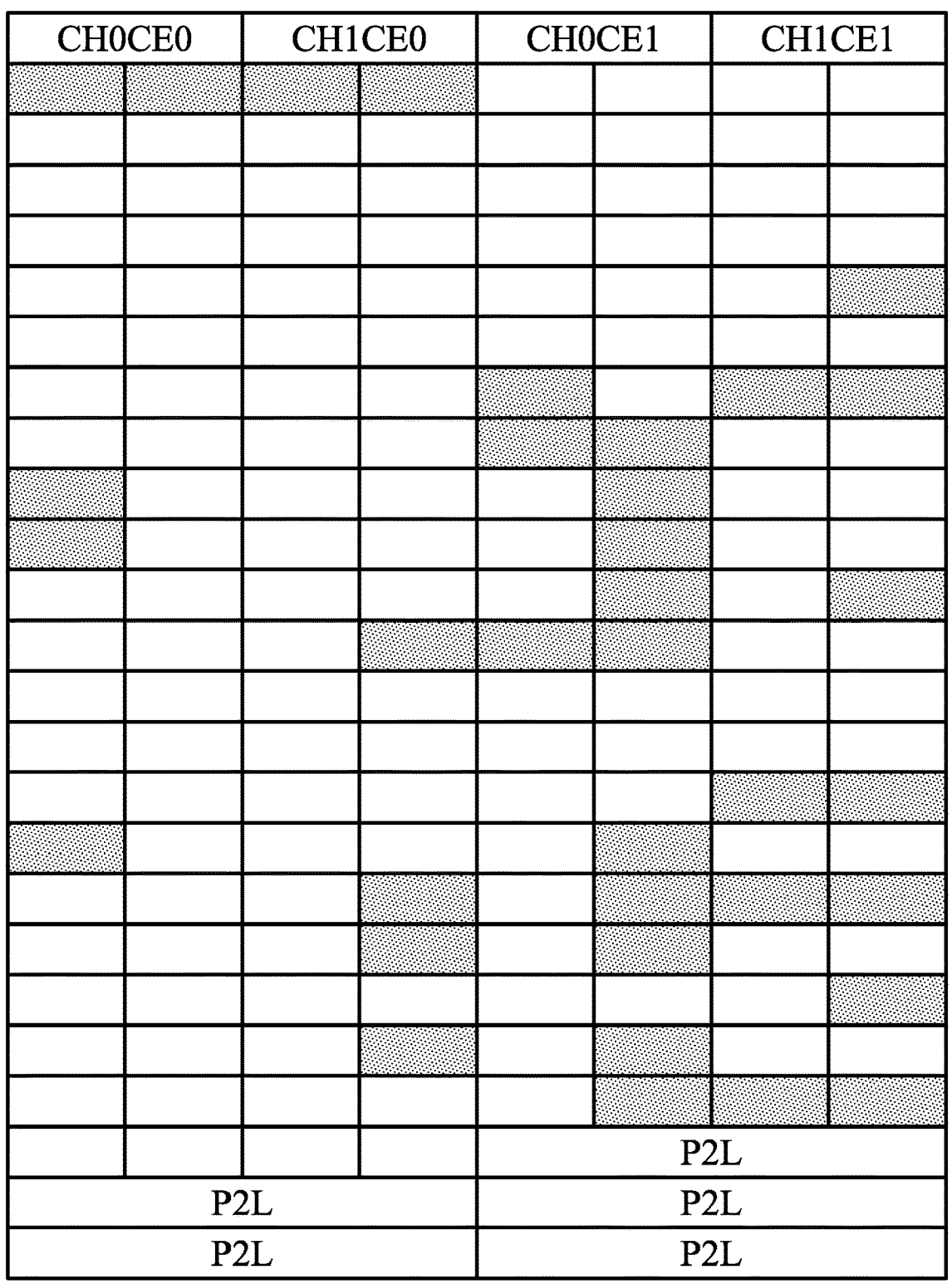
FIG. 5A is a schematic diagram illustrating the block according to an embodiment of the invention.

FIG. 5A is a schematic diagram illustrating the block according to an embodiment of the invention. In the embodiment, the data storage device 100 is the architecture of four channels and four storage arrays (4CH4CE). As shown in FIG. 5A, the block BLK is composed of four portions of CH0CE0, CH1CE0, CH0CE1 and CH1CE1. The block BLK includes several valid pages (represented by gray), several invalid pages (represented by white) and the mapping table P2L. Because the block BLK has many pages and the valid pages are scattered, it becomes difficult for storing and accessing data.

Figure 5B:
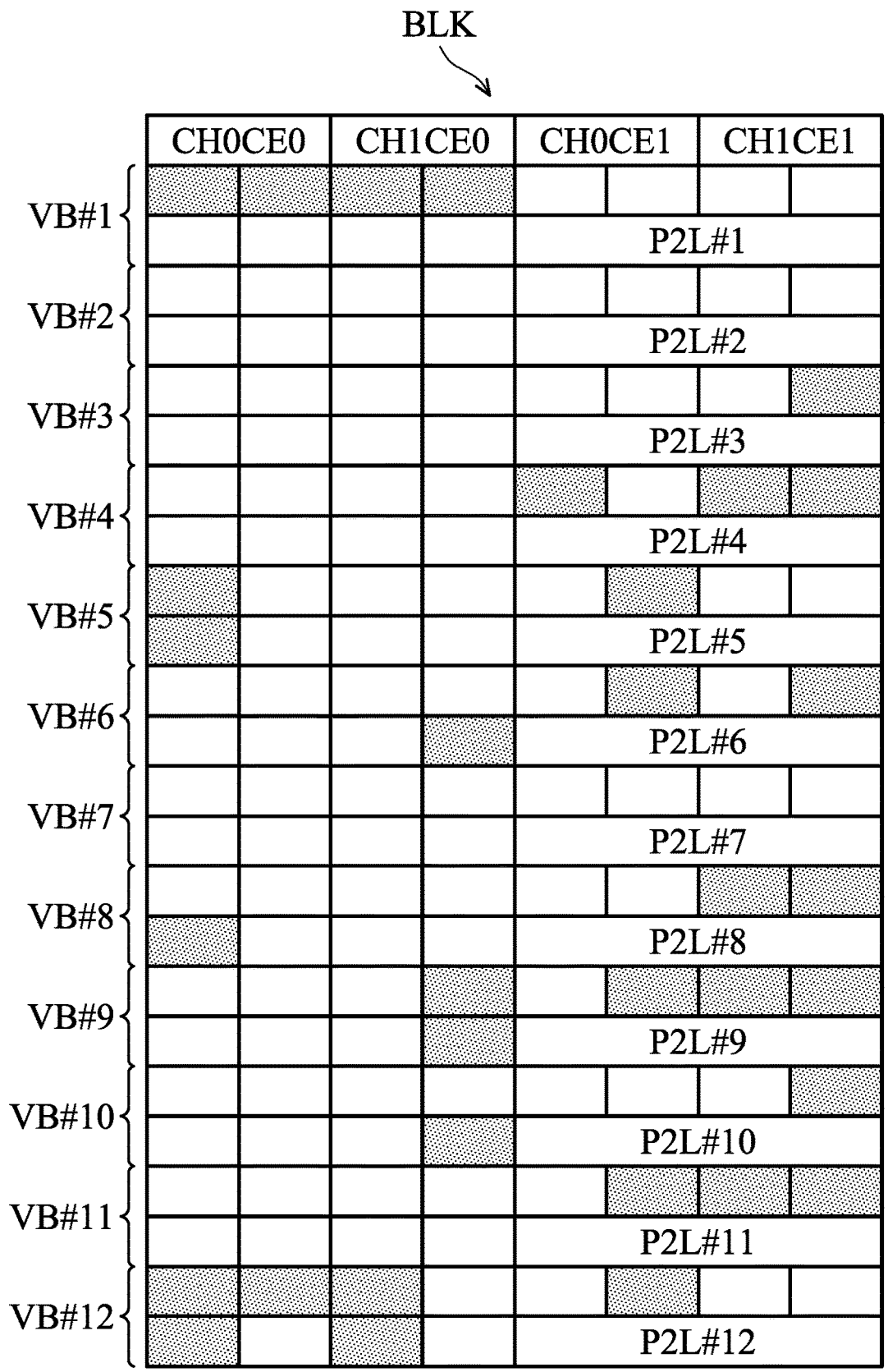
FIG. 5B is a schematic diagram illustrating the block and its virtual block according to an embodiment of the invention.

FIG. 5B is a schematic diagram illustrating the block and its virtual block according to an embodiment of the invention. In the embodiment, the block BLK is divided into several virtual blocks VB#1~VB#12, and the mapping table P2L is divided into several mapping tables P2L#1~P2L#12. Each of the mapping tables P2L#1~P2L#12 records the number of valid pages of its corresponding virtual blocks VB#1~VB#12, and the mapping information linking the physical address of the flash memory 140 with the logical address of the virtual blocks VB#1~VB#12. It can be known from the distribution of valid pages of FIG. 5B that the number of valid pages recorded by mapping table P2L#1 is 4, the number of valid pages recorded by mapping table P2L#2 is 0, the number of valid pages recorded by mapping table P2L#3 is 1, and the number of valid pages recorded by mapping table P2L#4 is 3.

Figure 5C:
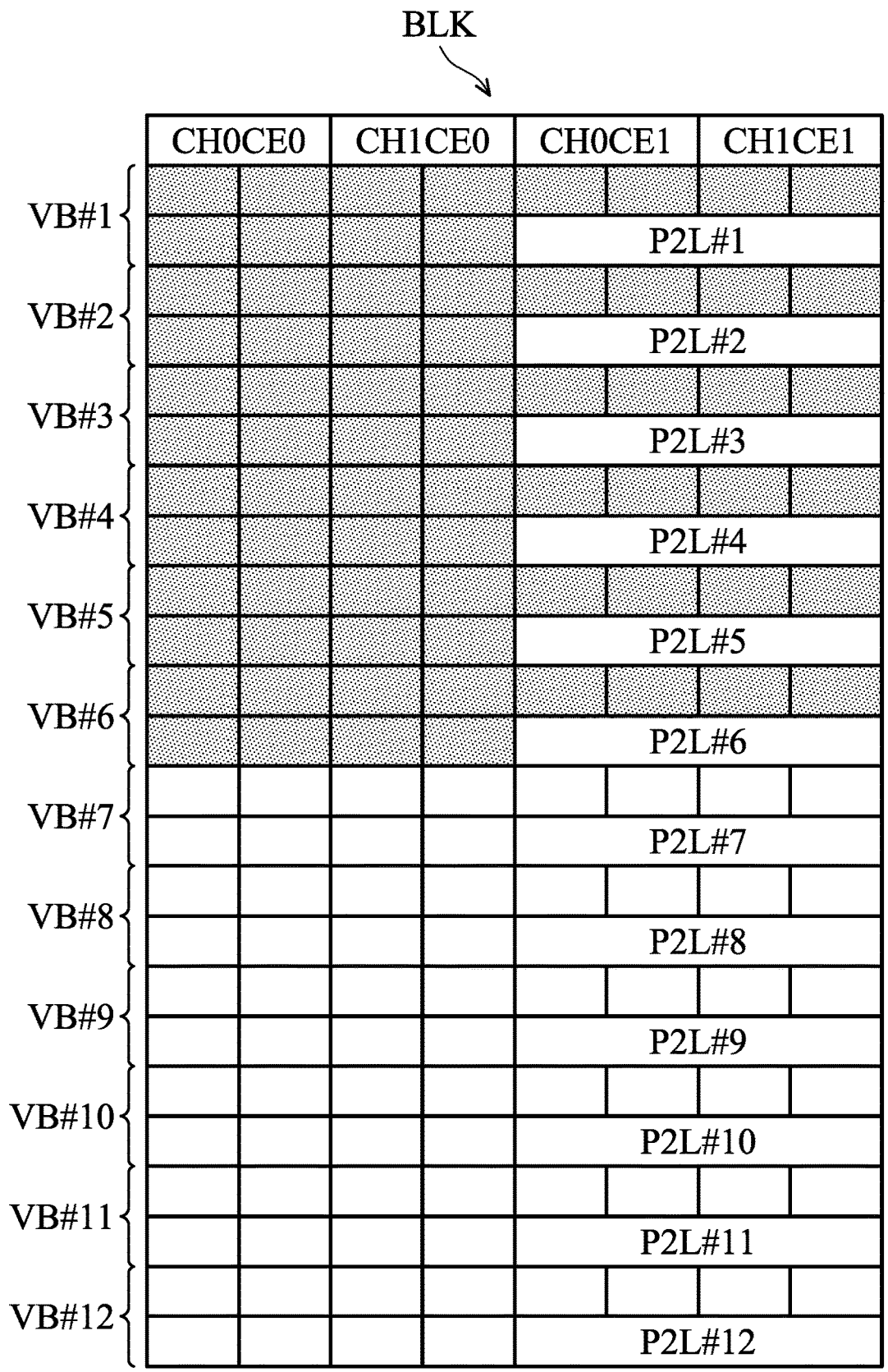
FIG. 5C is a schematic diagram illustrating the garbage collection process utilizing the virtual block and the mapping table according to another embodiment of the invention.

Because the number of valid pages recorded by the mapping tables P2L#1 and P2L#3~P2L#12 is not zero, the controller 120 performs the garbage collection process on the virtual blocks VB#1 and VB#3~VB#12. It should be noted that since the virtual block P2L#2 does not have any valid pages, the virtual block VB#2 will not be utilized for data access or for a garbage collection process. FIG. 5C is a schematic diagram illustrating the garbage collection process utilizing the virtual block and the mapping table according to another embodiment of the invention. Because the valid pages of the virtual blocks VB#1 and VB#3~VB#12 are merged in the garbage collection process, the valid pages of the block BLK will be reallocated and accumulated in the virtual blocks VB#1~VB#6 after the garbage collection process. Therefore, by utilizing the data storage method of the virtual blocks of the present invention, the efficiency of executing the garbage collection process can be improved.

The data storage method of the invention can achieve the goal of the present invention and provide other benefits. For example, when the garbage collection process is executed, the number of valid pages, the number of valid arrays and the amount of valid data of the EOB of the virtual block of the source block can be read directly. Therefore, the total amount of valid data of each virtual block of the source block can be obtained. For example, if the total amount of valid data of the virtual block VB#3 is 0, it means that the virtual block VB#3 does not store any valid data. The virtual block VB#3 can be skipped to inspect the valid data of the virtual block VB#4 directly. If the total amount of valid data of the virtual block VB#4 is greater than 0, such as 100, the controller 120 matches the mapping tables P2L#4 and L2P to generate the validity list bitMap. The validity of each page or each data is recorded sequentially by the validity list bitMap. For example, "1" is recorded for the valid data, and "0" is recorded for the invalid data. Afterwards, the controller 120 moves the valid data which corresponds to "1" to the destination block.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Therefore, the scope of the appended claims should be accorded the broadest interpretation so as to encompass all such modifications and similar arrangements.

What is claimed is:

1. A data storage method, comprising:
    selecting one of a plurality of blocks in a flash memory as an active block;
    dividing the active block into a plurality of virtual blocks, wherein each of the virtual blocks has a mapping table;
    selecting and accessing one of the virtual blocks; and
    maintaining the mapping table corresponding to the selected virtual block, wherein the mapping table corresponding to the selected virtual block records mapping information between a plurality of logical addresses and a plurality of physical addresses of the selected virtual block.

2. The data storage method as claimed in claim 1, wherein the mapping tables are stored in the flash memory or in a RAM.

3. The data storage method as claimed in claim 1, further including:
    counting and saving the number of valid data of the selected virtual block.

4. The data storage method as claimed in claim 1, the method further comprising:
    selecting and accessing another virtual block after the selected virtual block is closed.

5. The data storage method as claimed in claim 4, wherein the mapping table corresponding to the selected virtual block is stored when the selected virtual block is closed.

6. The data storage method as claimed in claim 4, wherein the mapping table corresponding to the selected virtual block further corresponds to another selected virtual block, and further records mapping information between a plurality of logical addresses and a plurality of physical addresses of the another selected virtual block.

7. The data storage method as claimed in claim 4, the method further comprising:
maintaining another mapping table corresponding to the another virtual block, wherein the another mapping table records mapping information between a plurality of logical addresses and a plurality of physical addresses of the another virtual block.

8. A data storage method, comprising:
selecting one of a plurality of blocks in a data storage device as an active block;
dividing the active block into a plurality of virtual blocks, wherein each of the virtual blocks has a mapping table;
selecting one of the virtual blocks;
issuing a command with a physical address of the selected virtual block to the data storage device; and
updating the mapping table corresponding to the selected virtual block to recode mapping information between a logical address and the physical address.

9. The data storage method as claimed in claim 8, wherein the mapping table corresponding to the selected virtual block is updated after the command is executed successfully.

10. The data storage method as claimed in claim 8, the method further comprising:
selecting another virtual block after the selected virtual block is closed.

11. The data storage method as claimed in claim 10, further comprising:
issuing another command to write a mapping table including mapping information between the physical address and the logical addresses to the data storage device to close the selected virtual block.

12. The data storage method as claimed in claim 10, further comprising:
counting and saving the number of valid data of the selected virtual block.

13. A method of data moving for a data storage device, comprising:
selecting a source block;
dividing the source block into a plurality of virtual blocks;
selecting one of the virtual blocks of the source block;
selecting a destination block;
determining whether the number of valid pages of the selected virtual block is zero; and
if the determination is true, selecting another virtual block of the source block.

14. The method of data moving as claimed in claim 13, wherein if the determination is false, moving valid data from the selected virtual block into the destination block.

15. A data storage device, comprising:
a flash memory, comprising a plurality of blocks, wherein each of the blocks comprises a plurality of pages; and
a controller, configured to select one of the blocks as an active block, and divide the active block into a plurality of virtual blocks, wherein each of the virtual blocks has a mapping table, the controller is further configured to select and access one of the virtual blocks and maintain the mapping table corresponding to the selected virtual block, wherein the mapping table corresponding to the selected virtual block records mapping information between a plurality of logical addresses and a plurality of physical addresses of the selected virtual block.

16. The data storage device as claimed in claim 15, wherein the controller counts and saves the number of valid data of the selected virtual block.

17. The data storage device as claimed in claim 15, wherein the controller selects and accesses another virtual block after the selected virtual block is closed.

18. The data storage device as claimed in claim 15, wherein the controller further saves a mapping table recording mapping information between the physical addresses of the selected virtual block and the logical addresses when the selected virtual block is closed.

* * * * *